(12) United States Patent
Shannon et al.

(10) Patent No.: US 7,048,892 B2
(45) Date of Patent: May 23, 2006

(54) SYSTEM AND APPARATUS FOR HIGH-PRESSURE, HIGH THROUGHPUT CHEMICAL SYNTHESIS

(76) Inventors: James Shannon, 10303 Longhome Rd., Louisville, KY (US) 40291; Michael Ferriell, 5705 Chenoweth Run Rd., Louisville, KY (US) 40299; Hossain Saneii, 6 Wolf Pen La., Louisville, KY (US) 40059

( * ) Notice: Subject to any disclaimer, the term of this patent is extended or adjusted under 35 U.S.C. 154(b) by 567 days.

(21) Appl. No.: 10/202,453

(22) Filed: Jul. 24, 2002

(65) Prior Publication Data
US 2004/0018121 A1    Jan. 29, 2004

(51) Int. Cl.
*B01L 3/02*    (2006.01)
(52) U.S. Cl. .................. 422/100; 422/102; 422/104
(58) Field of Classification Search ................. 422/100
See application file for complete search history.

(56) References Cited

U.S. PATENT DOCUMENTS 5,746,982 A * 5/1998 Saneii et al. ................. 422/134
6,566,461 B1 * 5/2003 Freitag et al. ................ 526/65

* cited by examiner

*Primary Examiner*—Jill Warden
*Assistant Examiner*—Natalia Levkovich
(74) *Attorney, Agent, or Firm*—Stites & Harbison; John E. Vanderburgh

(57) ABSTRACT

A system for automated high-pressure synthesis and more particularly a high-pressure reactor assembly comprises a reaction block and a pressure manifold for the introduction of pressure to the reaction wells of a reaction block. The reactor includes one or more pressure resistant reaction wells or vessels disposed in the reaction block.

5 Claims, 8 Drawing Sheets

SYSTEM AND APPARATUS FOR HIGH-PRESSURE, HIGH THROUGHPUT CHEMICAL SYNTHESIS

FIELD OF THE INVENTION

The invention relates to automated chemical synthesis and more particularly to a system for automated high pressure reactions and to a high-pressure reactor for high throughput synthesizers.

BACKGROUND OF THE INVENTION

Automated or robotic devices are used increasingly to synthesize compounds, particularly in the area of biochemical compound development in the search for new pharmaceutical compounds where it is necessary to synthesize large numbers of compounds. Automated synthesizers also find use for the synthesis of non-biochemical organic and inorganic compounds. However automated synthesizers, in which reagents are conventionally delivered to the reaction wells by one or more probes, are normally confined to synthesis protocols that can be carried out under relatively mild conditions of temperature and pressure. If pressure is required to either cause a reaction to occur or to speed up a reaction which proceeds slowly under ambient pressure it has been necessary to transfer the reagents to a reaction vessel adapted to withstand internal pressure and that has a fluid tight, pressure resistant seal. A probe cannot access such devices. Thus, automated synthesizers, that rely on robotic probes for delivery of reagents and washing solutions and the like, have not been used for high-pressure reactions such as, for example, high-pressure hydrogenation and high-pressure Diels-Adler reactions which involve the use of catalysts and pressure.

Accordingly it would be highly desirable to have a reaction vessel adapted for use with automated synthesizers and which can withstand relatively high internal pressure.

SUMMARY OF THE INVENTION

This invention relates to a system for automated high-pressure synthesis and more particularly to a high-pressure reactor assembly comprising a reaction block and a pressure manifold for the introduction of a pressure to the reaction block and to seal the wells of the reaction block. As used herein the term reaction wells and reaction vessels will be used interchangeably and the term is used to define the containment area or areas where a synthesis is carried out.

In one embodiment of the invention, the reactor of the present invention includes one or more pressure resistant reaction vessels disposed in the reaction block. The mouth of the reaction vessel is provided with a probe penetrable septum and is sealed with an access cap having a through running bore for the insertion of a probe into the interior of the reaction vessel. The pressure manifold is provided with sockets that correspond with the wells in the reaction block and that are aligned therewith when the high-pressure reactor is assembled. Each of the sockets is adapted to receive a high-pressure plug that is inserted into the access cap when the pressure manifold is assembled on the reaction block. The high-pressure plug also has a through running bore for fluid communication between the bore of the access cap and a source of pressure provided by a fluid from the pressure manifold. During operation the pressure manifold is initially removed from the reaction block and the necessary reagents to carry out the synthesis are charged in a conventional manner to the reaction vessel by a probe that is in fluid communication with a source of the various reagents. The pressure manifold is clamped over the upper face of the reaction block. This simultaneously inserts the pressure plugs into the access caps of the reaction vessels in the corresponding wells of the reaction block. Pressure is applied to the reaction vessels by fluid under pressure from the pressure manifold through the pressure plug and access cap. Pressure is maintained during the course of the synthesis.

In a preferred embodiment of the invention the thickness of the reaction block is reduced and the height of the wells reduced to support sockets for securing the lower ends of pressure resistant reaction vessels. In this manner the overall weight of the reactor assembly is substantially reduced and the manufacturing cost lowered.

The high-pressure reactor assembly can be adapted for discharging reaction products and/or washing the vessel ingredients during a synthesis by the provision of ducts formed in the reaction block that open into the reaction wells for fluid communication with a manifold or discharge line. In this embodiment the reaction block is provided with valves for controllably opening and closing the ducts. The valve arrangement described and illustrated in Saneii et al., application Ser. No. 09/352,097, filed Jul. 12, 1999, entitled IMPROVED REACTION BLOCK ASSEMBLY FOR ROBOTIC CHEMICAL SYNTHESIS, can be utilized for controlling the opening and closing of the ducts with good results. When employing the pressure resistant vessels to carry out a synthesis tubes external to the pressure resistant vessels are provided in place of the ducts that are formed in the reaction block. The same valve assemblies can be utilized. The discharge line can lead to waste disposal or to a collection point from which the discharged material can be led to apparatus, such as a cooling unit or an analyzer, such as a gas chromatograph.

In an embodiment of the invention particularly adapted for gaseous reactions, the reaction block can be inverted with the pressure manifold on the bottom of the reaction block assembly. In this embodiment the reaction vessel is open at both ends and the high-pressure plug is inserted into the reaction vessel through its bottom while the mouth of the reaction vessel is provided with a septum as described above for addition of gaseous reactant by a probe. Before pressurizing the reaction vessels, a solid plate is clamped over the top of the reaction block to seal the reaction vessels. Synthesis employing liquid reagents can also be carried out by this embodiment although in that case it is essential that sufficient positive pressure be maintained at the high-pressure plug at all times in order to retain the reagents in the reaction vessel.

In a similar but slightly different embodiment of the invention, the gaseous reactants can be introduced directly into the reaction block through the bottom mounted pressure manifold and high-pressure plug. In this embodiment the top of the reaction block is closed and the need for a separate plate to close the top of the reaction block is eliminated.

In another embodiment, the wells of the reaction block themselves are adapted to receive the high-pressure plug by forming the access cap in the reaction block as an integral part of the well. In this manner the high-pressure plug is inserted directly into the well of the reaction block and the well itself serves the function of the pressure resistant vessel referred to above. The need for separate reaction vessels is eliminated.

Preferably, the reaction block is heat conductive for the transfer of heat energy to and from the reaction vessels in the reaction block depending upon the synthesis protocol.

DESCRIPTION OF THE PREFERRED EMBODIMENT

Figure 1:
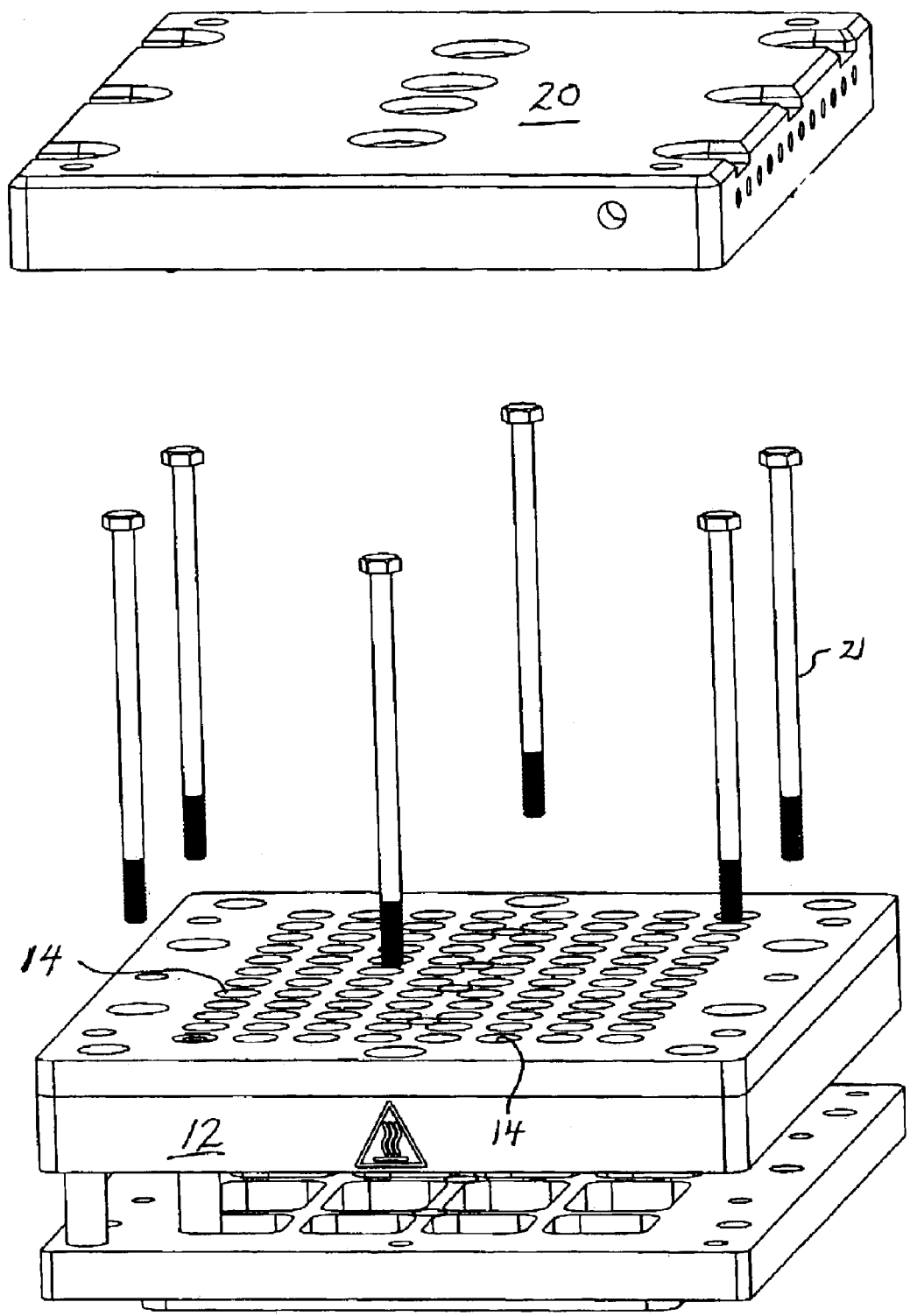
FIG. 1 is an exploded perspective view of a reactor assembly designed in accordance with the invention for high-pressure synthesis.

A reactor for high-pressure reactions in accordance with the invention is illustrated in FIG. 1. In the embodiment illustrated the high-pressure reactor, shown generally as 10, comprises a reaction block 12 and a pressure manifold 20 overlying the reaction block. A plurality of wells 14 in the reaction block 12 open to its upper surface. As illustrated, the wells 14 are arranged in rows as in a standard 96 well titer plate. It will be understood that the reaction block 12 can be provided with a greater or lesser number of wells 4 although the 96 well reaction block is preferred as the standard. The manifold plate 20 is secured to the reaction block 12 by any suitable securing system such as, for example, bolts 21.

Figure 2:
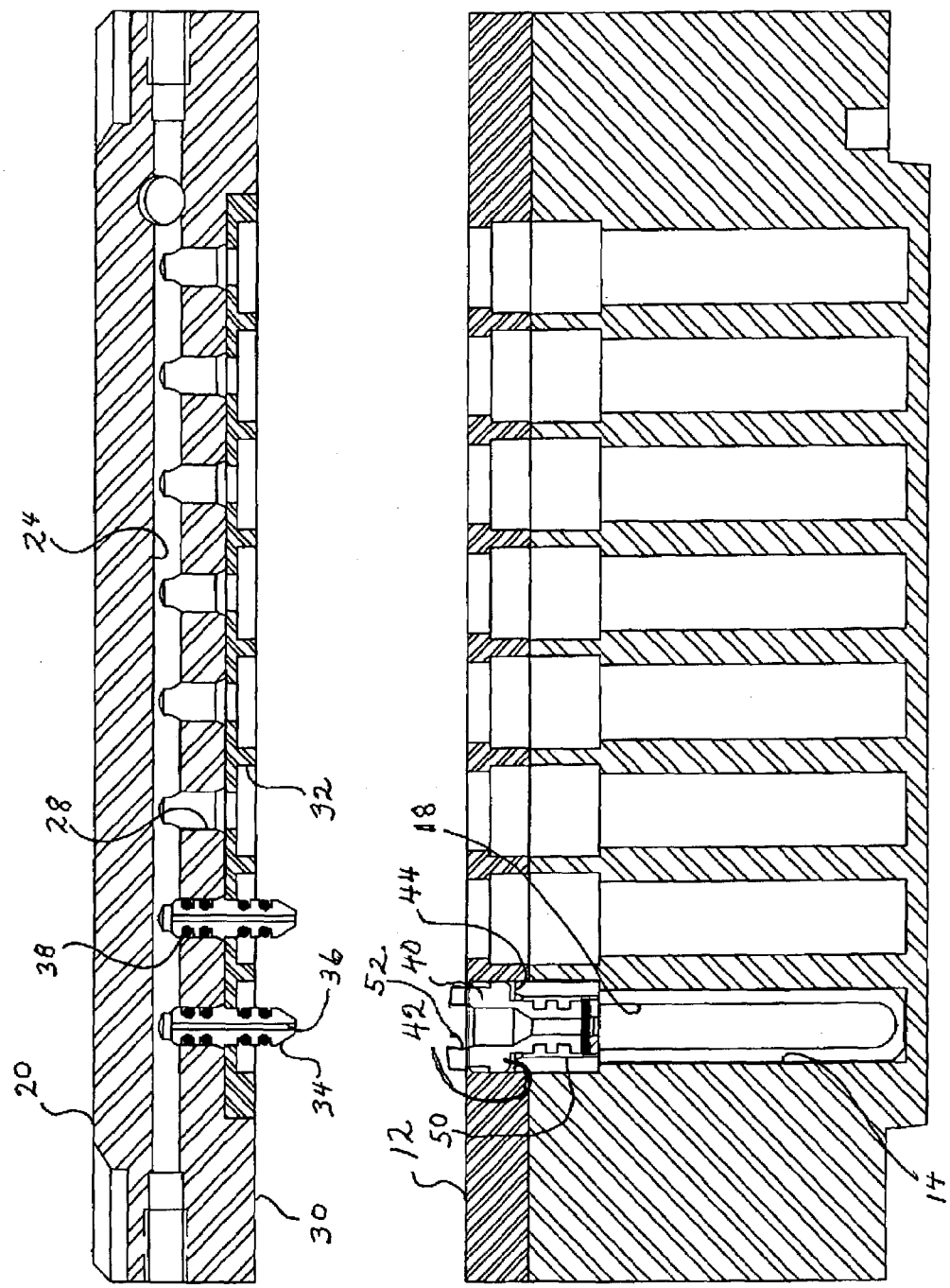
FIG. 2 is a side sectional view of the reactor assembly of FIG. 1.
Figure 3:
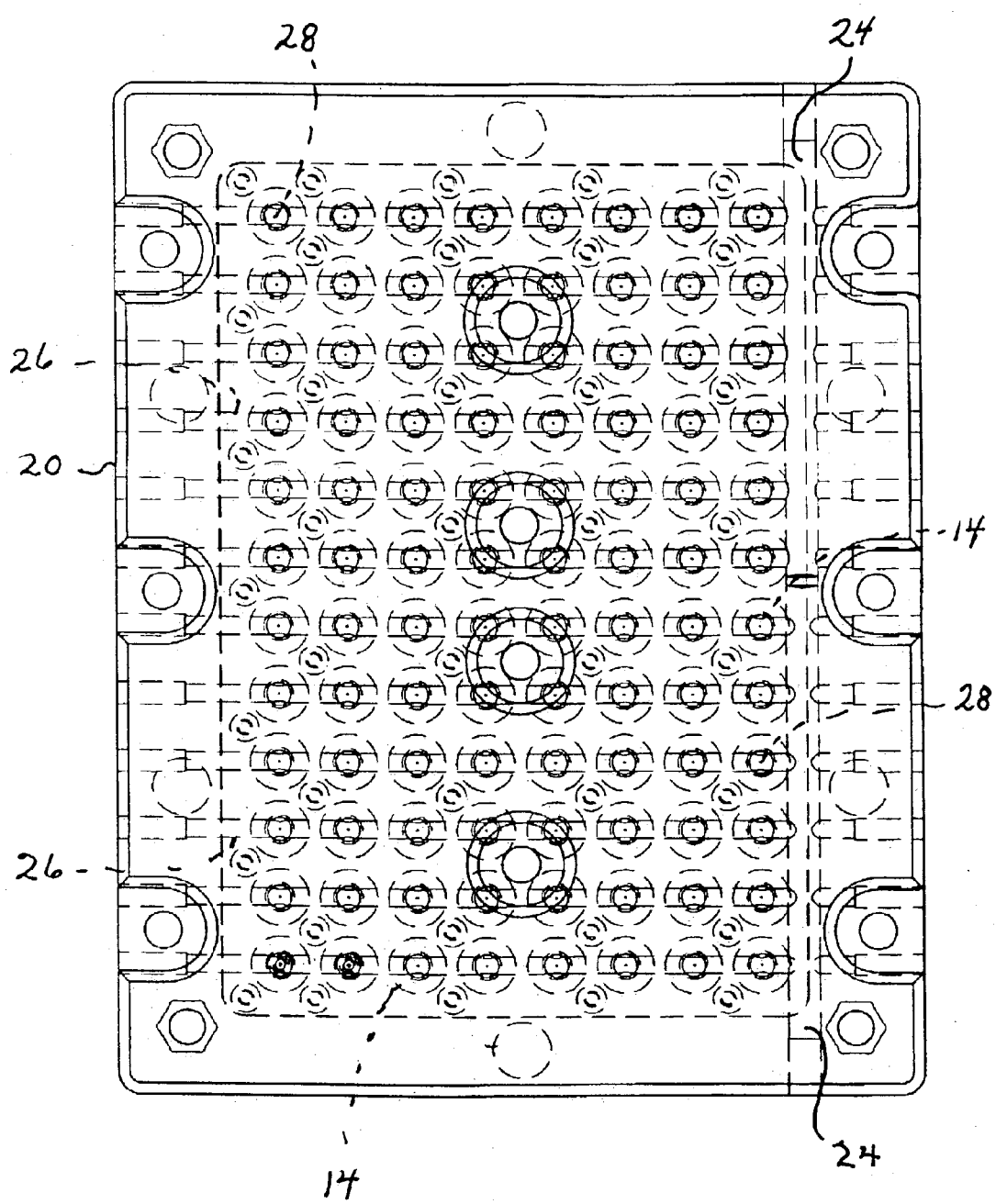
FIG. 3 is a top view of the pressure manifold of the reaction block assembly of FIG. 1.

As shown in more detail in FIGS. 2 and 3, the pressure manifold 20 is provided with a longitudinal conduit 24 that communicates with a source of a pressurized fluid (not shown). Lateral passages 26 extend across the pressure manifold 20 open to the longitudinal conduit 24 and are closed at their opposite ends. The lateral passages 26 are spaced apart to be aligned with the rows of wells 14 when the pressure manifold 20 is in position on the reaction block 12. Likewise, ducts 28 in the lateral passages 26 are aligned with the openings of the wells 14 for fluid communication with the interior of the wells 14 when the pressure manifold 20 is assembled on the reaction block 12.

Figure 6:
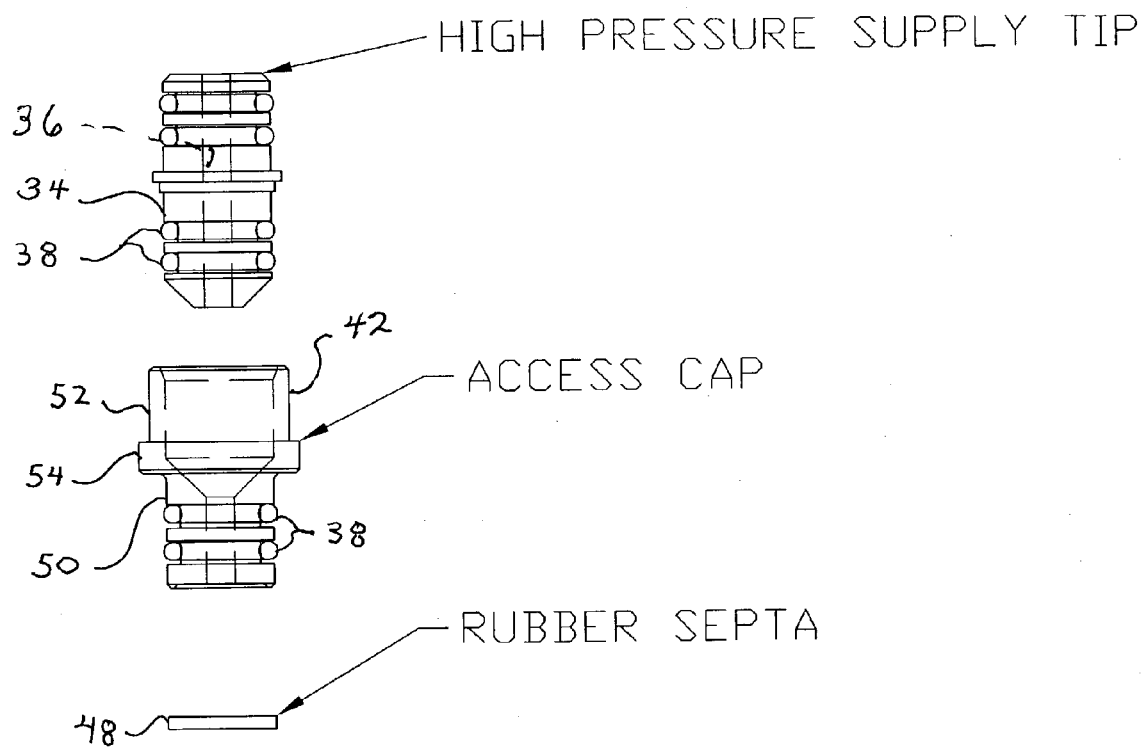
FIG. 6 is an exploded side view of a pressure resistant vessel and pressure plug.
Figure 6:
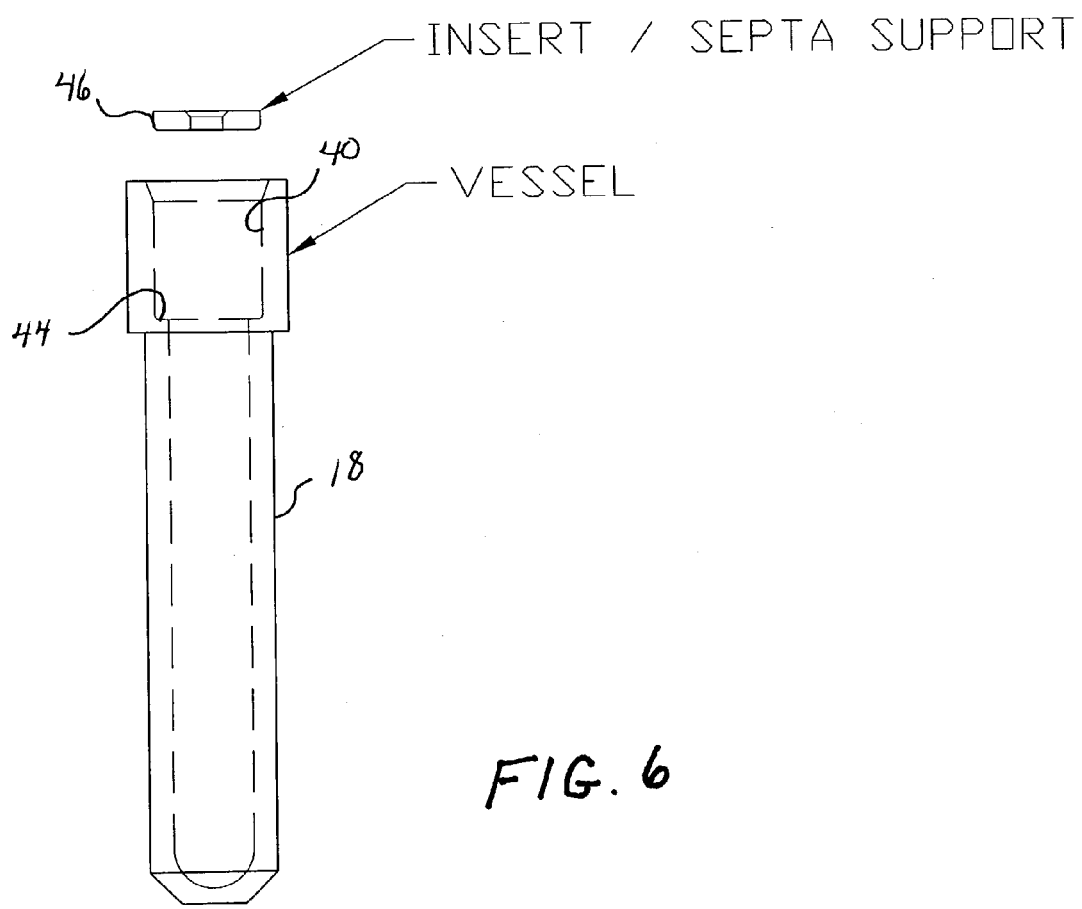
Figure 7:
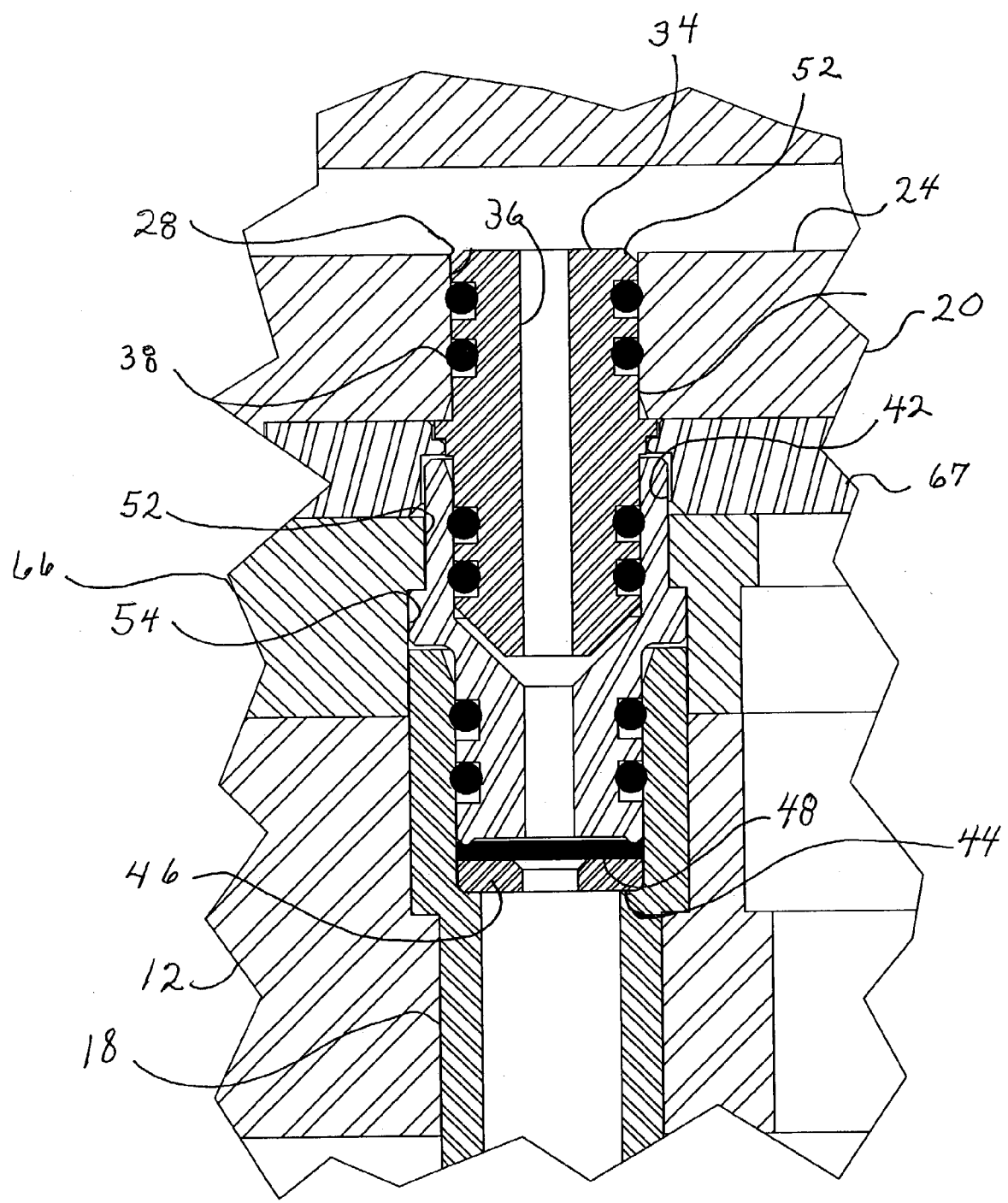
FIG. 7 is a sectional detail in enlarged scale broken away for compactness of illustration of a portion of the reaction assembly and pressure resistant vessel as assembled.

The lower face 30 of the pressure manifold 20 is provided with a plurality of sockets 32 into which the ducts 28 open. The sockets 32 are arranged in the same pattern and number to conform to the arrangement of the wells 14 in the reaction block 12. When the reactor 10 is fully assembled, each socket 32 is aligned with the opening in a corresponding well 14. For purposes of illustration in FIG. 2, a pressure plug 34 is mounted in two of the sockets 32 although in actual practice a pressure plug is disposed in each of the sockets of the pressure manifold 20. As is shown in FIGS. 6 and 7, the pressure plug 34 includes a through running bore 36 for fluid communication with a corresponding duct 28 in a lateral passage 26 in the pressure manifold 20. O-rings 38 provide a fluid tight seal between the walls of the socket 32 and the pressure plug 34.

The reaction vessel 18 consists of an elongated tubular member that is configured to fit in the wells 14 of the reaction block 12. The walls of the reaction vessel 18 are of sufficient thickness and strength to withstand the pressure applied during a high-pressure reaction protocol. The upper portion 40 of the interior of the reaction vessel 18 adjacent to its mouth is enlarged with respect to remainder of the interior of the reaction vessel. The enlarged portion is adapted to receive an access cap 42 that functions both to receive a probe for robotic delivery of reactants and a pressure plug 34, during a high-pressure reaction with the pressure manifold 20 secured on the reaction block 12. A shoulder 44 is formed at the junction of the enlarged upper portion 40 and the remainder of the interior of the reaction vessel 18. An insert 46 having an outside diameter essentially the same as the diameter of the upper portion 40 of the interior of the reaction vessel 18 is supported in the reaction vessel by the shoulder 44. The insert 46 carries a probe penetrable septum 48 for sealing the reaction vessel 18 when the pressure manifold 20 is not in place, such as during the robotic delivery of reactants to the reaction vessel.

The access cap 42 consists of a lower body portion 50 having an outside diameter sized to permit a snug fit in the enlarged upper portion 40 of the reaction vessel 18 and a head portion 52 that extends above the upper surface of the reaction block 12. A flange 54 is formed on the head portion 52 supports the access cap 42 on the upper surface of the reaction block 12.

The access cap 42 includes a bore 56 for fluid communication between the bore 36 of the high-pressure plug 34 and the interior of the reaction vessel 18. The diameter of the portion of the bore 56 running through the enlarged head portion 52 is greater than the diameter of the bore running through the lower body portion 50 to receive the lower part of the pressure plug 34. When the pressure manifold 20 is positioned on the upper surface of the reaction block 12, the pressure plug 34 is inserted into the access cap 42 for delivery of pressurized fluid to the interior of the reaction vessel 18. The pressurized fluid enters the reaction vessel 18 through the puncture hole in the septum 48 created by insertion of the probe. If a probe has not penetrated the septum 48, it is highly preferred to create a small hole in the septum prior to introduction of the pressurized fluid. It will be understood, however, that, although not a preferred method, in the absence of a puncture hole, the pressurized fluid can generate sufficient pressure to rupture the septum 48 and pressurize the interior of the reaction vessel 18.

An intermediate securing plate 58 may be disposed between the reaction block 12 and the pressure manifold 20. The intermediate securing plate 58 is provided to prevent the unintentional withdrawal of a pressure resistant reaction vessel. This may occasionally occur by the withdrawal of a probe through the septum 48 after adding a reagent to the reaction vessel. The intermediate securing plate 58 is provided with openings 19 corresponding to the openings of the wells 14. The flange 54 has a larger diameter than the openings 19 in the intermediate securing plate 58. As assembled, the head portion 52 of the access caps 42 extends through the respective openings 19 in the intermediate securing plate 58 and the pressure resistant reaction vessel 18 is prevented from being withdrawn from its well by contact between the flange 54 and the lower surface of the intermediate securing plate.

In operation, using automated synthesis apparatus, the reaction vessels are placed in the wells 14 of the reaction block 12. The reagents, normally in liquid form, are delivered by a probe carried by a robotic arm that travels between a source of the reagent and the reaction vessels 18 pursuant to a pre-programmed computerized protocol. Any solid materials, such as solid catalysts and the like, are normally introduced into the reaction vessels 18 prior to the insertion of the insert 46, the septum 48 and the access cap 42. Once the reaction vessels 18 are charged with reactants, the robotic arm or arms are withdrawn and the pressure manifold 20 is assembled on the reaction block 12. As properly positioned, the pressure plugs 34 carried by the pressure manifold 20 are aligned with the bore 56 of the enlarged head of the access caps 42 and the depending portions are inserted therein. The pressure manifold 20 is supported on the upper edges of the head portion 52 of the access cap 42. Where the intermediate securing plate 58 is employed, the pressure manifold 20 may be contiguous with the upper surface of the securing plate. When fully inserted in the access caps 42, the bore of each pressure plug 34 is aligned with the bore 56 of the lower body portion 50 of a corresponding access cap 42 to provide fluid communication from the pressure manifold 20 to the interior of the reaction vessels 18. As long as pressure is required for the reaction, communication between the source of pressurized fluid through the pressure manifold 20 to the reaction vessels 18 is maintained. Pressure is released by discontinuing the flow of pressurized fluid and disconnecting the pressure manifold 20 from the source of pressurized fluid. In the alternative other means for releasing the pressure can be employed. For example, a pressure relief valve (not shown) can be installed in the line 22 to release pressurized fluid from the reaction vessels 18.

As mentioned above, the reaction block 12 is preferably formed from a heat conductive material such as aluminum. Channels (not shown) in the reaction block 12 carry heating and cooling fluids for control of the temperature in the interior of the reaction vessels 18. As is conventional in the art, the reaction block 12 can also be placed on a separate heating and cooling unit for conductance of thermal energy through the bottom of the reaction block.

The selection of the pressurized fluid is a matter of choice by one having ordinary skill in the art and depends upon the reaction being conducted. Preferably the pressurized fluid is a gas such as for example, an inert gas, such as helium or argon that is employed to provide only pressure in the reaction vessel. However, in some cases the pressurized fluid may itself be a reactant. For example, for high-pressure hydrogenation reactions, hydrogen gas will serve as the pressurized fluid. Similarly carbon monoxide can be employed both as a reactant and as the pressurized fluid in carbonylation reactions under pressure and in the presence of a catalyst such as palladium on carbon.

The reactor of the present invention can be utilized for reactions carried out at pressures in excess of about 80 psi. The upper limit is dependent upon the materials from which the reaction block 12 and the pressure manifold 20 are constructed and the source of pressurized fluid. The reactor is particularly suited for reactions carried out at the preferred range of pressures of between about 700 psi to 1800 psi.

Figure 4:
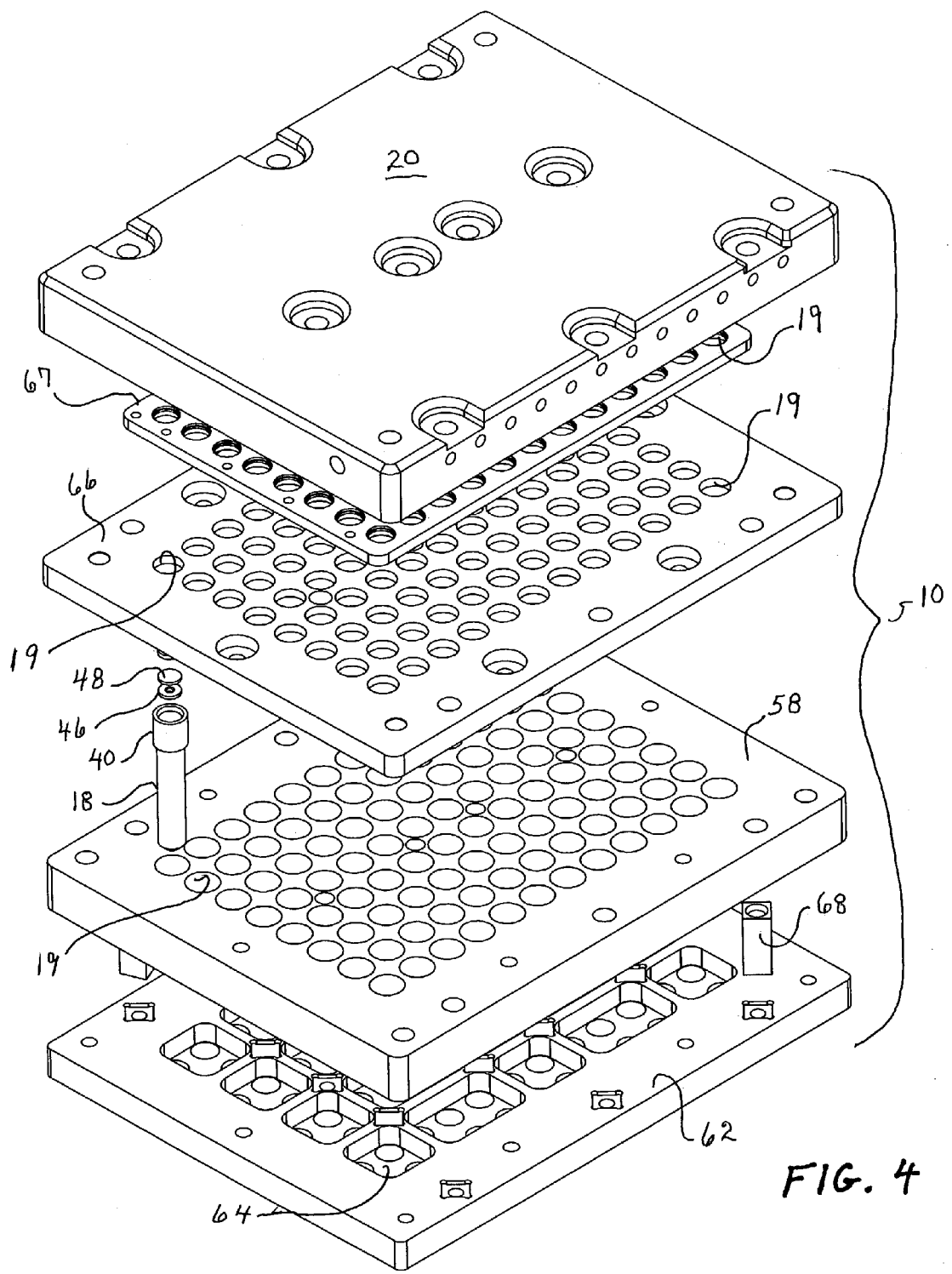
FIG. 4 is an exploded view of a pressure resistant reaction vessel for use in carrying out reactions under pressure in automated synthesis apparatus in accordance another embodiment of the invention.
Figure 5:
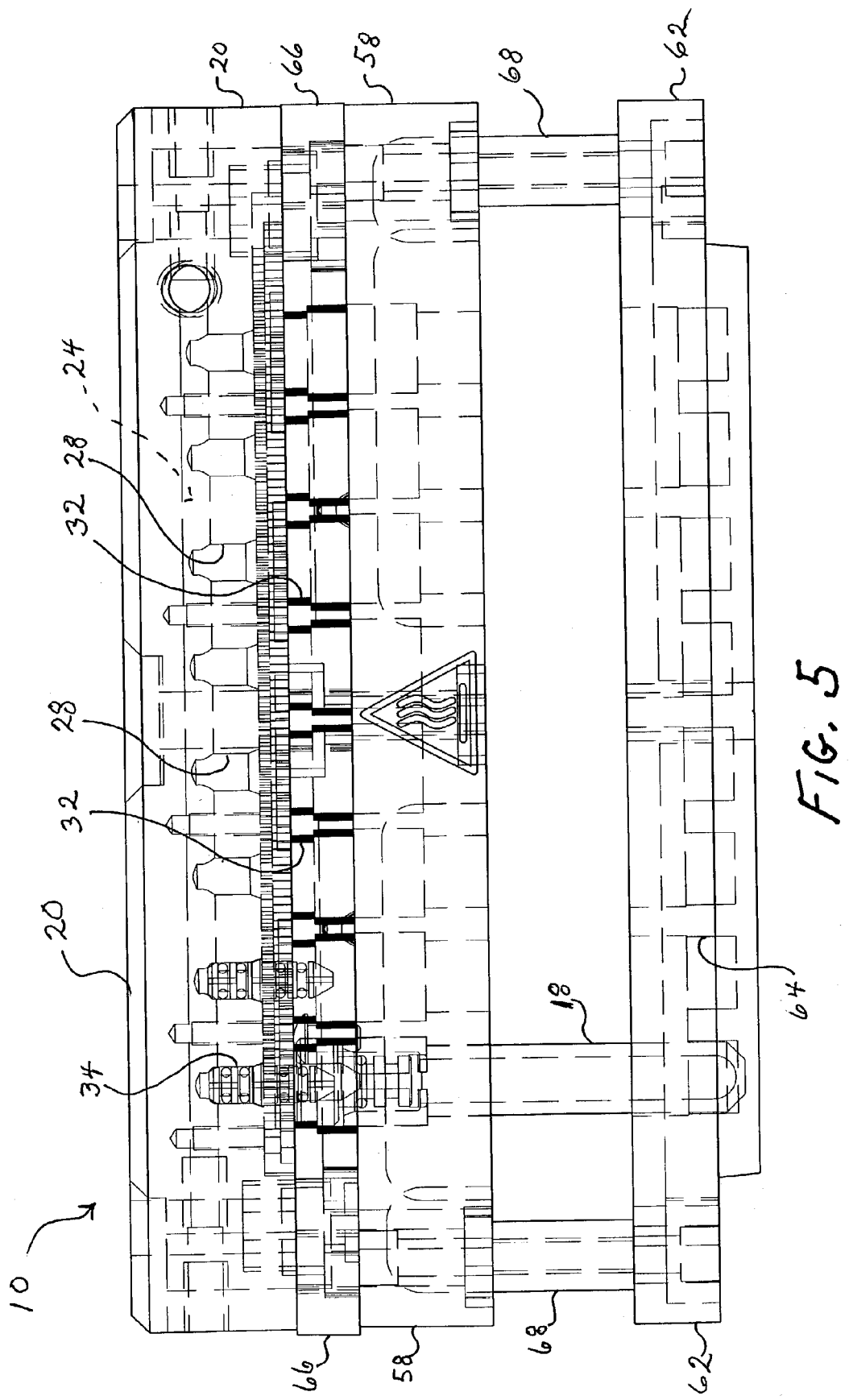
FIG. 5 is a side view of the reaction block of FIG. 4 with portions shown in phantom.

Referring to FIGS. 4 and 5, in which like reference numbers denote like parts and functions, another embodiment of the invention is shown in which the reaction block is replaced by a support block 62 that is provided with a plurality of support sockets 64. The reactor 10 further includes the pressure resistant reaction vessels 18, the lower portions of which are received in the sockets 64 of the support block 62. An upper securing plate 66 and the intermediate securing plate 58 are both provided with the openings 19 that correspond with the number and position of the sockets in the support block 62. As illustrated, a suitable gasket 67 is disposed between the pressure manifold 20 and the upper securing plate 66. The gasket 67 is also provided with openings to correspond with the openings 19 of the upper securing plate 66. Spacers 68 support the intermediate securing plate 58 on the support block 62. The intermediate support plate 58 in this embodiment supports the pressure resistant reaction vessels 18 in their respective sockets 64 and the upper securing plate 66 receives the upper portion 40 of the pressure reaction vessels 18 to prevent any substantial vertical movement due to the insertion and removal of a probe.

The pressure manifold 20 is placed over the upper securing plate 66 to pressurize the reaction vessels 18 by the delivery of a pressurized fluid through a line 22. The pressure manifold 20 is secured by suitable means such as, for example bolts that extend through the spacers into the support block 62. The operation of the pressure manifold 20, the pressure plugs 34, the access caps 42 and the high-pressure reaction vessels 18 for this embodiment of the invention is the same as described above in connection with the embodiment described above and illustrated in FIGS. 1–3. This embodiment of the invention results in a substantial reduction in the weight of the reactor 10.

It will be understood that a reaction block 12 can be designed for high-pressure reactions without the necessity of using the reaction vessels 18 discussed above. In this case, the mouth portion of the wells 14 of the reaction block 12 are enlarged with respect to the remainder of the interior of the well to receive an insert 46, septum 48 and access cap 42 that serve the purpose and function in the manner described above. Operation of the specially designed reaction block is the same as described above in connection with the embodiment of the invention illustrated in FIGS. 1,2 and 3.

Figure 8:
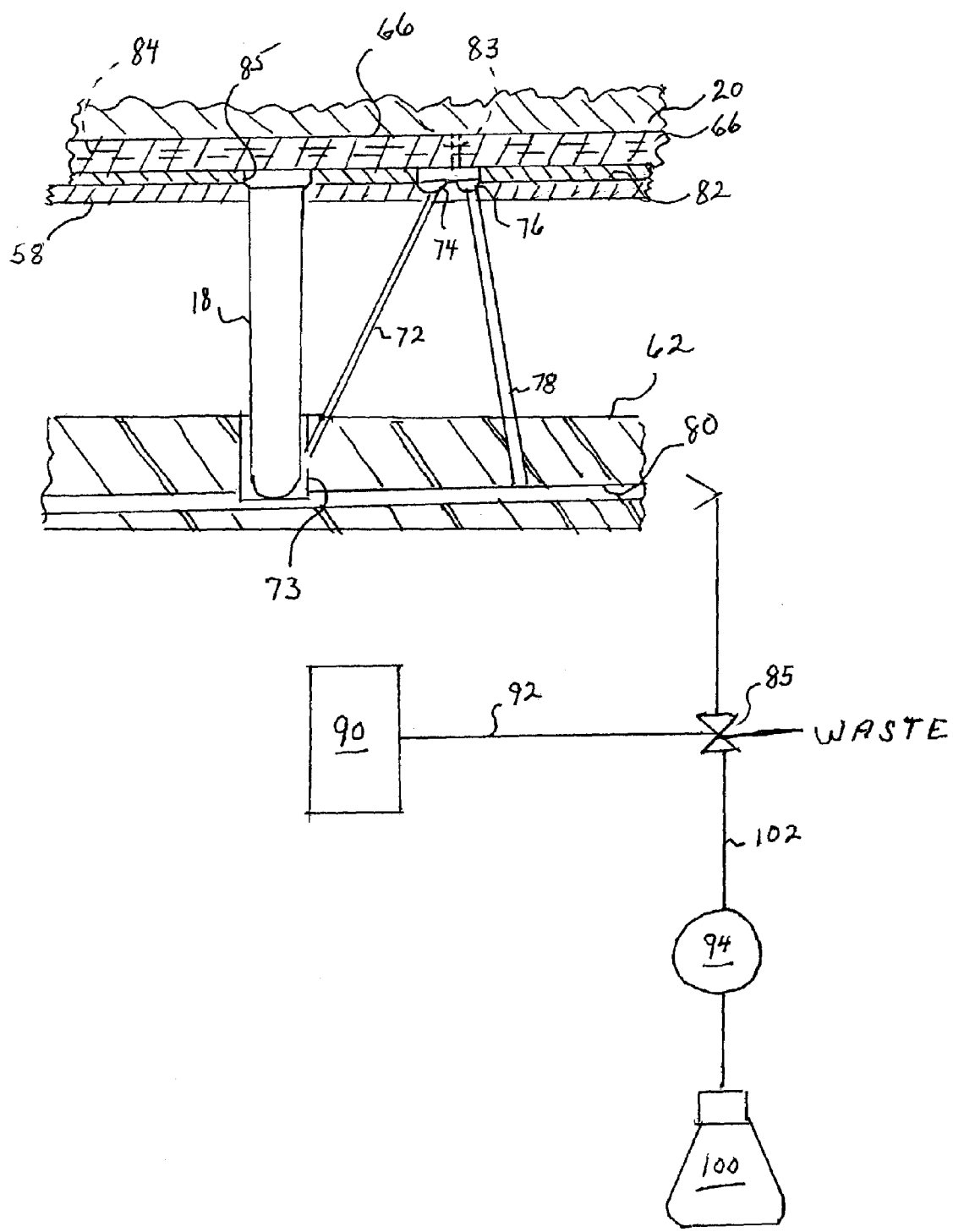
FIG. 8 is a schematic diagram of the apparatus of the present invention.

Referring to FIG. 8, wherein like reference numbers indicate like parts and function, a system is illustrated in which the reactor assembly 10 is adapted for automated flushing of the contents of the high-pressure reaction vessels 18 for purposes of washing the contents or for recovery and/or analysis of the reaction products. The reactor assembly 10, as described above in FIGS. 4 and 5, includes the support block 62, the intermediate securing plate 58 and the upper support plate 66. The pressure manifold 20 and pressure plug 34 are positioned and function as described above. In this embodiment an outlet tube 72 communicates with the interior of the reaction vessel 18 through an opening 73 in the lower portion of the wall of the reaction vessel and extends to a first port 74 in the upper surface of the reaction block 12 or, where present and as shown if FIG. 8, in the upper surface of the upper securing plate 66. A second port 76 is located adjacent the first port 74 and normally is in fluid communication therewith. A discharge tube 78 extends from the second port to a discharge manifold 80 in the reaction block 12 or as shown in the support block 62. A membrane valve is formed at each of the first and second ports, 74 and 76 respectively by a membrane sheet 82 that is disposed between the upper securing plate 66 and the pressure manifold 20 to overlie each first port 74 and each second port 76. The membrane sheet 82 is provided with holes 85 to correspond with the openings 19 in the upper securing plate 66 through which can extend the upper end of the reaction vessel 18. A duct 83 communicates between the lower face of the upper securing plate 66 and a pressure fluid conduit 84 in the upper securing plate. The pressure fluid conduit 84 communicates with a source of pressurized fluid that is led in through the conduit 84 and duct 83 to act against the membrane to close the ports, 74 and 76. The structure and operation of the membrane valve 82 is more fully described in Saneii et al. application Ser. No. 09/352,007, mentioned above, and is incorporated by reference herein. The discharge tube 78 communicates with a conduit formed in the support block 62 that in turn communicates with a valve 85 through a line 86. Depending on the position of the valve, the contents of the line 86 can be sent to waste or to an analytical instrument 90, such as a gas chromatograph through a line 92 or to secondary treatment 94, such as a chiller, and collection 100 through a line 102. It will be understood that this arrangement of tubes and membrane valves is provided for reaction vessel.

In operation upon completion of the high pressure synthesis the pressure in the reaction vessel 18 is reduced but not totally relieved so that a positive pressure is maintained in the vessel. Pressure on the membrane valve 82 is relieved to permit fluid communication between the first port 74 and the second port 76. Positive pressure in the vessel forces the fluid contents in the reaction vessel 18 through the outlet tube 72 and the discharge tube 78 through the now open first port 74 and second port 76 through the conduit and the line for analysis, collection or to waste.

While the system has been described in connection with the reactor assembly described in FIGS. 4 and 5, it will be clear that the automated flushing features of the invention are achieved as well by substituting the reaction block 12 of the reactor assembly of FIGS. 1, 2 and 3 as modified as described above by the provision of the first and second ports, 74 and 76 respectively, on the upper surface of the reaction block that are closed by membrane valves formed by the membrane sheet 82 that is disposed between the reaction block 12 and the intermediate securing plate 58. The membrane valves are pressure activated by a pressurized fluid acting against the membrane through the duct 83 that communicates between the lower face of the intermediate securing plate 66 and a pressure fluid duct 84 in the upper securing plate that communicates with a source of pressurized fluid, such as the longitudinal conduit 24 of the pressure manifold 20. Since the reaction block 12 is a solid body (except for the provision of the reaction wells 18) the outlet tube 72 and the discharge tube 78 are replaced by an outlet passage and a discharge duct which have the same function and serve the same purpose as the outlet tube and the discharge tube. In all respects the system operates in the same manner as described above in connection with the system of FIG. 8.

From the foregoing it can be seen that the present invention provides a reactor that is adapted for the automated synthesis of reactions that are carried out under pressure. The present invention makes possible high throughput, automated reactions that require pressure, such as for example, many catalytic reactions, using existing high throughput automated apparatus. Heretofore such high-pressure reactions required additional steps to transfer the reactants to separate pressure reaction apparatus. The necessary transfer of reactants renders the advantages of high throughput automated apparatus for high-pressure reactions.

As will be understood by those skilled in the art, various arrangements which lie within the spirit and scope of the invention other than those described in detail in the specification will occur to those persons skilled in the art. It is therefor to be understood that the invention is to be limited only by the claims appended hereto.

We claim:

1. A system for automated high-pressure synthesis comprising a reactor assembly consisting of a reaction block defining an upper surface, the reaction block having a plurality of reaction wells arranged in rows and opening to the upper surface of the reaction block, a pressure manifold defining a lower face disposed on the upper surface of the reaction block, the lower face of the pressure manifold being provided with a plurality of sockets corresponding in pattern and number to conform to the arrangement of the wells in the reaction block when the pressure manifold is in position on the reaction block, each socket being aligned with the opening in a corresponding well and having first ducts opening into the sockets in fluid communication with a longitudinal conduit in the pressure manifold that communicates with a source of a pressurized fluid and second ducts in communication with a source of pressurized fluid opening to the lower face of the pressure manifold adjacent each opening of the reaction wells, a plug being disposed in each of the sockets for normally closing the opening of the corresponding reaction well, the plug including a through running bore for fluid communication with a corresponding duct in a corresponding socket to pressurize each individual reaction well, a membrane sheet disposed between the, reaction block and the pressure manifold, the membrane sheet having openings to correspond with the openings of the reaction wells, a first port and a second port in fluid communication located in the upper surface of the reaction block adjacent each opening of the reaction wells and in substantial alignment with the opening of a corresponding second duct, the lower portion of each reaction well having an opening for communication with an outlet passage communicating between the first port and the interior of the reaction well, a discharge duct extending from the second port to a discharge conduit, a membrane valve being formed by the membrane sheet at each first port and second port, the membrane being urged over the first port and the second port by a pressurized fluid from the corresponding second duct to cut fluid communication between the first and the second port to seal the interior of the reaction vessel and upon release of the pressure to be forced away from the first and the second ports to reestablish fluid communication there between whereby pressure within the reaction vessel forces fluid from the reaction vessel through the outlet passage and the first port to the second port and the discharge and out of the reaction block through the discharge conduit, a line in communication with the discharge conduit for recovery of the fluid from the reaction wells for subsequent treatment, analysis or disposal.

2. The system of for automated high-pressure synthesis of claim 1 further including an analytical instrument in communication with the line from the discharge conduit.

3. The system for automated high-pressure synthesis of claim 1 wherein the line from the discharge conduit communicates with apparatus for secondary treatment of fluid from the reaction wells.

4. A system for automated high-pressure synthesis consisting of a support block that is provided with a plurality of support sockets for receiving, a plurality of pressure resistant reaction vessels therein, an upper securing plate overlying an intermediate securing plate, each plate being provided with openings that correspond with the number and position of the sockets in the support block, the plates being supported in spaced relation above the support block and in alignment therewith so that upper end portions of the pressure reaction vessels can extend through the openings of the upper and intermediate securing plates, a pressure manifold including a conduit in communication with a source of pressurized fluid, the pressure manifold being secured over the upper securing plate, the lower face of the pressure manifold being provided with a plurality of sockets corresponding in pattern and number to conform to the arrangement of the sockets in the support block, each socket being aligned with a corresponding socket and having a first duct in fluid communication with the conduit in the pressure manifold, the first duct opening into the corresponding socket and a second duct in communication with a source of pressurized fluid opening to the lower face of the pressure manifold adjacent each opening for the reaction vessels, a plug being disposed in each of the sockets for normally closing the opening of the corresponding reaction vessel, the plug including a through running bore for fluid communication with a corresponding duct in a corresponding socket to pressurize each individual reaction vessel, a membrane sheet disposed between the upper and intermediate securing plates, the membrane sheet having openings to correspond with the openings in the upper and the intermediate securing plates, a first port and a second port in fluid communication located in the upper surface of the intermediate securing plate adjacent each opening for the reaction vessels and in substantial alignment with the opening of a corresponding second duct, the lower portion of each reaction vessel having an opening for communication with an outlet tube communicating between the first port and the interior of the reaction vessel, a discharge tube extending from the second port to a discharge conduit, a membrane valve being formed by the membrane sheet at each first port and second port, the membrane being urged over the first port and the second port by a pressurized fluid from the corresponding second duct to cut fluid communication between the first and the second port to seal the interior of the reaction vessel and upon release of the pressure to be forced away from the first and the second ports to reestablish fluid communication therebetween whereby pressure within the reaction vessel forces fluid from the reaction vessel through the outlet passage and the first port to the second port and the discharge and out of the support block through the discharge conduit, a line in communication with the discharge conduit for recovery of the fluid from the reaction wells for subsequent treatment, analysis or disposal.

5. The system for automated high-pressure synthesis of claim 4 wherein the line from the discharge conduit communicates with apparatus for secondary treatment of fluid from the reaction wells.

* * * * *

UNITED STATES PATENT AND TRADEMARK OFFICE
CERTIFICATE OF CORRECTION

PATENT NO. : 7,048,892 B2  Page 1 of 1
APPLICATION NO. : 10/202453
DATED : May 23, 2006
INVENTOR(S) : Shannon et al.

It is certified that error appears in the above-identified patent and that said Letters Patent is hereby corrected as shown below:

Claim 1, col, 8 , line 24: Remove the comma after the word "the"

Signed and Sealed this

Third Day of October, 2006

JON W. DUDAS
*Director of the United States Patent and Trademark Office*